(12) United States Patent
Sirosh et al.

(10) Patent No.: US 7,868,775 B2
(45) Date of Patent: Jan. 11, 2011

(54) SAFETY WARNING AND SHUTDOWN DEVICE AND METHOD FOR HYDROGEN STORAGE CONTAINERS

(76) Inventors: Neel Sirosh, 2 Washington, Irvine, CA (US) 92606; Robert Miller, 200 W. Woodruff Ave., Arcadia, CA (US) 91007; Tony Staples, 8049 E. Santa Cruz Ave., Orange, CA (US) 92869

( * ) Notice: Subject to any disclaimer, the term of this patent is extended or adjusted under 35 U.S.C. 154(b) by 519 days.

(21) Appl. No.: 11/614,936

(22) Filed: Dec. 21, 2006

(65) Prior Publication Data
US 2007/0159345 A1 Jul. 12, 2007

Related U.S. Application Data

(60) Provisional application No. 60/753,774, filed on Dec. 23, 2005.

(51) Int. Cl.
*G08B 21/00* (2006.01)
(52) U.S. Cl. ............... 340/612; 340/450.2; 340/447
(58) Field of Classification Search ........... 340/612, 340/446, 447, 449, 450, 450.2, 611, 613–620, 340/621, 626, 632; 423/248, 648.1, 644
See application file for complete search history.

(56) References Cited

U.S. PATENT DOCUMENTS

| 4,570,822 | A | * | 2/1986 | Procacino | 222/14 |
|---|---|---|---|---|---|
| 4,703,174 | A | | 10/1987 | Anderson et al. | |
| 5,207,251 | A | * | 5/1993 | Cooks | 141/83 |
| 5,427,160 | A | * | 6/1995 | Carson et al. | 141/4 |
| 5,522,428 | A | * | 6/1996 | Duvall | 137/624.11 |
| 5,589,823 | A | * | 12/1996 | Lange | 340/622 |
| 5,701,863 | A | | 12/1997 | Cemenska et al. | |
| 5,823,234 | A | * | 10/1998 | Boertz | 141/67 |
| 6,505,470 | B1 | * | 1/2003 | Drube et al. | 62/49.2 |
| 6,653,005 | B1 | * | 11/2003 | Muradov | 429/19 |
| 6,913,031 | B2 | * | 7/2005 | Nawata et al. | 137/12 |
| 7,030,770 | B2 | * | 4/2006 | Howard et al. | 340/652 |
| 7,239,778 | B2 | * | 7/2007 | Chen | 385/37 |
| 7,406,987 | B2 | * | 8/2008 | Takano et al. | 141/82 |
| 2005/0178463 | A1 | * | 8/2005 | Kountz et al. | 141/4 |

FOREIGN PATENT DOCUMENTS

JP 2003-028393 A 1/2003

* cited by examiner

*Primary Examiner*—Daniel Previl
(74) *Attorney, Agent, or Firm*—Mark H. Krietzman (57) ABSTRACT

The present disclosure provides an alternative, cost-effective safety feature for on-board hydrogen storage containers incorporating a fill cycle sensor with a driver warning and shutdown system. The system monitors the number of times a hydrogen container is filled, and then takes action at a predetermined termination point. A controller monitors each time the hydrogen container is filled above 90% of the rated pressure or mass. Once the predetermined termination point of fill cycles is reached, the disclosed device/method will either disable the valve or refueling mechanism such that fuel supply to the vehicle is shutoff and the container cannot be filled again, essentially assuring the end of the life of the container.

25 Claims, 6 Drawing Sheets

SAFETY WARNING AND SHUTDOWN DEVICE AND METHOD FOR HYDROGEN STORAGE CONTAINERS

RELATED APPLICATION DATA

This application claims the benefit of priority to U.S. Provisional Application Ser. No. 60/753,774, filed on Dec. 23, 2005 and entitled "Safety Warning and Shutdown Device And Method For Hydrogen Storage Containers", which is incorporated by reference in the present application in its entirety.

BACKGROUND

1. Field

A safety mechanism designed for an on-board hydrogen storage and supply system to deliver hydrogen to a vehicle powertrain is disclosed. The mechanism provides a safety warning and shutdown system and method for hydrogen storage devices.

2. Description of Related Art

Hydrogen is the most abundant element in the universe and can be a great energy source. Hydrogen is increasingly touted as the fuel of the future since hydrogen can yield significant environmental benefits and can be produced from a variety of fossil and renewable energy sources. Hydrogen can be stored in compressed or liquid form or in solid state either chemically or through adsorptive means.

There exist three fundamental requirements for a hydrogen storage system: (1) the ability to receive fuel from an external source; (2) provide enough fuel storage capacity to allow the powertrain to provide adequate travel range for the vehicle; and (3) supply fuel on demand, at the required rate, to the powertrain.

However, due to the low energy density of hydrogen, storage of the hydrogen is challenging. Currently, one way hydrogen may be stored is in high pressure containers. These containers must be large and are subject to stresses and strains during each pressurization cycle, leading to material fatigue and a reduction in strength.

Presently compressed hydrogen on-board storage systems are designed to support 750 to 1,000 fill cycles per year, for a period of about 15-20 years. The pressure vessels are tested to support 15,000 leak and rupture-free cycles and for an additional 30,000 rupture-free cycles. Assuming a range of 200 miles per fill, the current requirements equate to 150,000 to 200,000 miles per year, leading to considerable over-design and resulting in weight and cost penalties to the container design. As a result, current container designs are not cost effective.

In the absence of well-defined mechanisms to assure that systems that exceed cycle life are positively taken out of service, the industry continues to encourage over-design as the only means of assuring safety. This results in higher costs for production and maintenance of on-board hydrogen storage and supply systems.

SUMMARY

The present disclosure provides an alternative, cost-effective safety feature for on-board hydrogen storage containers that is an improvement over the prior art, by eliminating the need for over-design. A system and method comprising a fill cycle counter with a driver warning and shutdown system is disclosed.

In one implementation, a safety warning and shutdown system and method for a hydrogen storage container is disclosed comprising a valve attached to the container, the valve having a check valve for filling the hydrogen storage container, an electrical solenoid, pressure transducer, and a temperature transducer; a sensor to monitor the number of fill cycles; and a shut-off device to disable further use of the hydrogen system after reaching a pre-determined limit for the number of fill cycles.

In exemplary implementation, the sensor is a strain gauge placed in the fuel container. The strain gauge may be a number of different gauges known in the art. In one implementation, the sensor comprises a strain gauge utilizing embedded optical fibers to measure the strain in the container. In another implementation, the sensor a mechanical strain gauge in the container to measure strain. In still another implementation, the sensing system incorporates an acoustic emissions generator and receiver to monitor structural strains due to pressurization of the container.

In other implementations, the safety warning and shutdown system and method incorporates a sensor in the valve. In one exemplary implementation, a strain gauge comprising a membrane located in the valve In further implementations, the system comprises a warning device to notify a user of a vehicle that the system is nearing pre-determined limit.

In still other implementations, software and hardware measures are utilized to prevent tampering with the system once the system as reached the pre-determined limit.

The safety warning and shutdown system may also comprise a controller that counts the number of fill cycles. In exemplary implementation, a fill cycle is counted each time the hydrogen container is filled above 90% of the rated pressure or mass.

In other exemplary implementations, the controller deactivates the electrical solenoid to disable the valve and prevent further use of the hydrogen system after the number of fill cycles has reached the pre-determined number. The controller could also deactivate the check valve to disable the valve and prevent further use of the hydrogen system after the number of fill cycles has reached the pre-determined number.

In exemplary implementations, the controller is the engine control unit. In other implementations, the controller is a separate microprocessor attached to the hydrogen container or a mechanical counter.

Other objects, features, and advantages of the present disclosure will become apparent from the subsequent description and the appended claims.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

The present disclosure provides an alternative, cost-effective safety feature incorporating fill cycle counter with a driver warning and shutdown system 5. The system 5 monitors the number of times a hydrogen container 10 is filled, and then takes action at a predetermined termination point. A sensor 40 monitors each time the hydrogen container 10 is filled above 90% of the rated pressure or mass. Once the preset life is reached, the disclosed device/method will either disable the valve 12 or refueling mechanism such that fuel supply to the vehicle is shutoff and the container 10 cannot be filled again. This essentially assures the end of life of the container 10.

Figure 1:
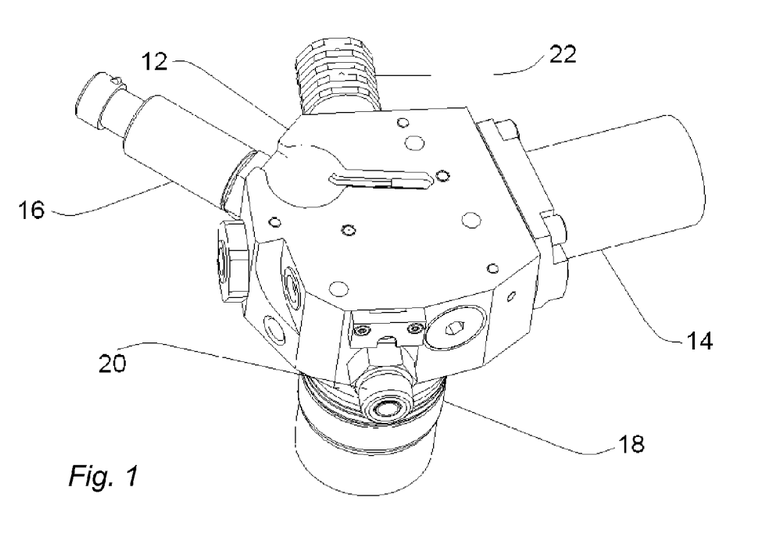
FIG. 1 is a perspective view illustrating a hydrogen storage system incorporating the devices of the disclosure integrated in the container valve.

In an exemplary implementation of the shutdown device and system 5 illustrated in FIG. 1, a shut-off valve assembly 12 is attached to the wall of container 10 12. The container 10 is placed on-board a vehicle that utilizes hydrogen for fuel. For example, a typical container 10 for on-board hydrogen storage is designed to have a rated pressure of about 5000 to 10,000 psi.

Figure 2:
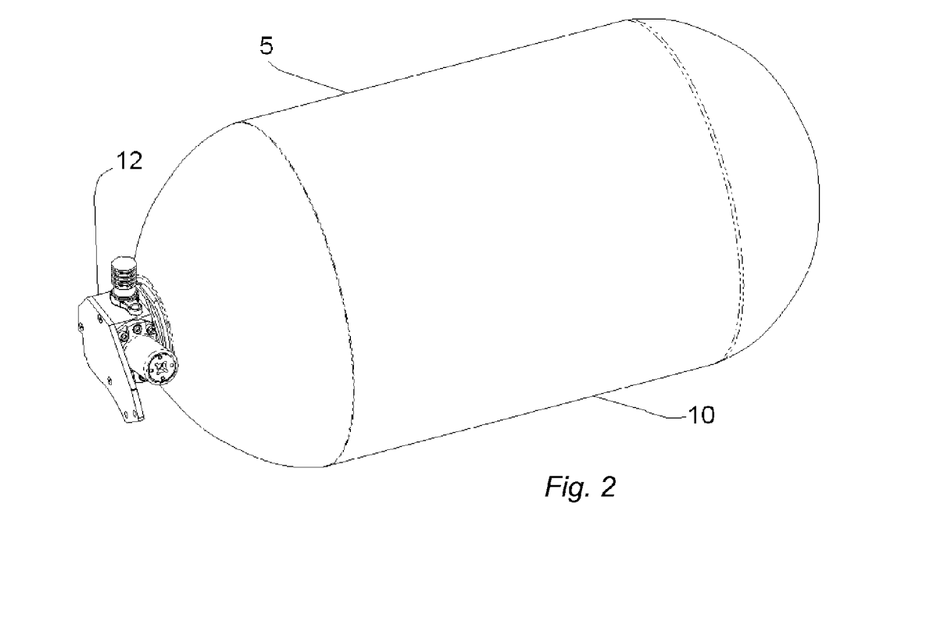
FIG. 2 is a perspective view illustrating details of a container valve that incorporates the devices of the disclosure.

As illustrated in FIG. 2, an exemplary valve assembly 12 comprises an electrical solenoid shut-off valve 14, pressure transducer 16, temperature transducer 18 and a check valve 20. The valve 12 may also have a pressure relief device 22 if the internal pressure increase beyond the design pressure. Hydrogen is filled in the container 10 through check valve 20 which only allows unidirectional flow, i.e. flow into the container 10. Upon demand from the powertrain, hydrogen flows out of the container 10 through the valve opening.

From safety considerations, hydrogen storage containers a limited lifespan. Once a sufficient number of fill cycles, and thus high strain has been placed on the container 10, the container can no longer be utilized. This system provides a means to monitor the amount of strain and fatigue placed on the hydrogen storage container 10

To monitor the life of the container 10, a sensor 40 is incorporated to monitor the number of fill cycles to the container 10. In exemplary implementations, the sensor 40 is a strain gauge. Any type of gauge or sensor 40 may be utilized to signal that a fill has been made.

In exemplary implementations of the disclosure, the sensor 40 is built into either the container 10 wall or valve 12 to detect each time the container 10 is filled. The sensor 40 monitors the number of fill cycles until the number of fill cycles reaches a predetermined termination point. When the number of fill cycles have reached this predetermined termination point, a shut-off device is activated.

In exemplary implementations, anytime the container 10 is filled above 90% of the rated service pressure or the rated mass of hydrogen, a significant event has occurred. When such a significant event has occurred, the sensor 40 indicates that a fill cycle should be counted. It is also possible to count a number of partial fills as one complete fill event.

Figure 7:
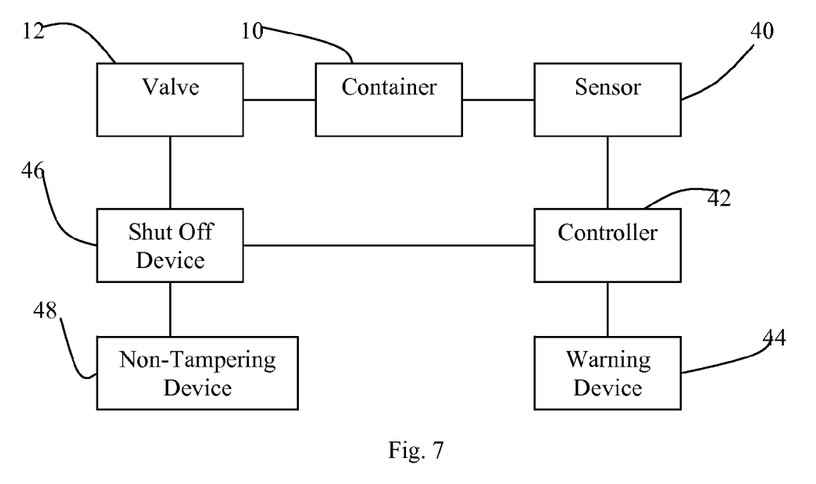
FIG. 7 illustrates a system block diagram of the hydrogen storage container safety and shutdown system in accordance with the present disclosure.

In further implementations, a controller 42 is utilized to count the number of cycles. Once the system has reached the predetermined termination point for the number of fill cycles, the controller 42 will activate a shut-off device 46 to prevent the system from allowing any further fill cycles.

For example, a vehicle may have an expected utilization of about 250,000 miles. A typical on-board hydrogen storage container 10 has a range of about 200 miles. Thus, the container 10 would be designed for fill cycles totaling about 1250 cycles. In this example, 1250 would be the predetermined termination point for the number of cycles for the exemplary hydrogen storage system. After the controller 42 has counted the number of cycles designed for the system, the shut-off device 46 is activated. However, these numbers are only an illustrative. One skilled in the art could design another container utilizing the disclosed safety and shutdown device with various ranges and design parameters.

Figure 3:
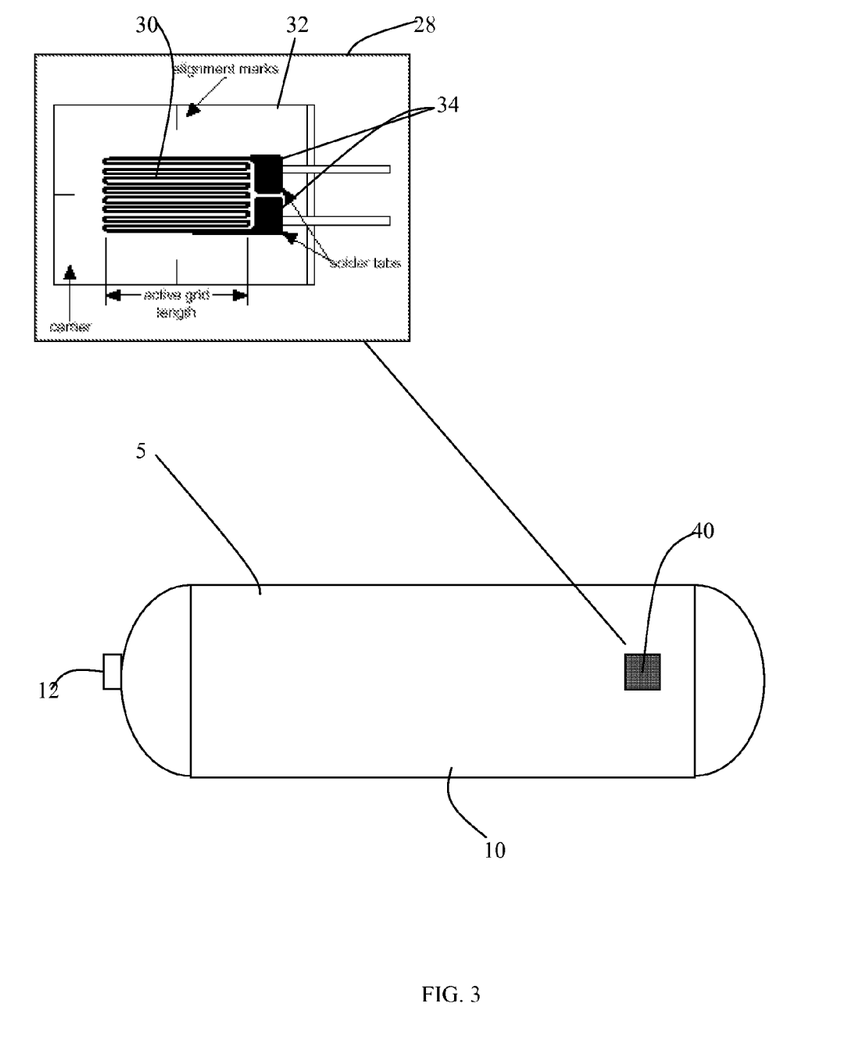
FIG. 3 illustrates one implementation of the hydrogen storage system, depicting a metal strain gauge present in the container.

In the implementation illustrated by FIG. 3, the sensor 40 may be a metallic strain gauge 28. The metallic strain gauge 28 comprises a very fine wire 36 or, more commonly, metallic foil arranged in a grid pattern 30. The grid pattern 30 maximizes the amount of metallic wire or foil 36 subject to strain in the parallel direction. The grid 30 is bonded to a thin backing, or carrier 32. For example, the grid 30 may be bonded to the carrier 32 utilizing solder tabs 34. The carrier 32 is mounted to the container 10 wall. When strain is experienced by the container 10 during a fill cycle, the strain is transferred directly to the strain gauge 28, increasing the length of the grid 30. The metallic strain gauge 28 then responds with a linear change in electrical resistance, thereby sensing the fill cycle.

Figure 4:
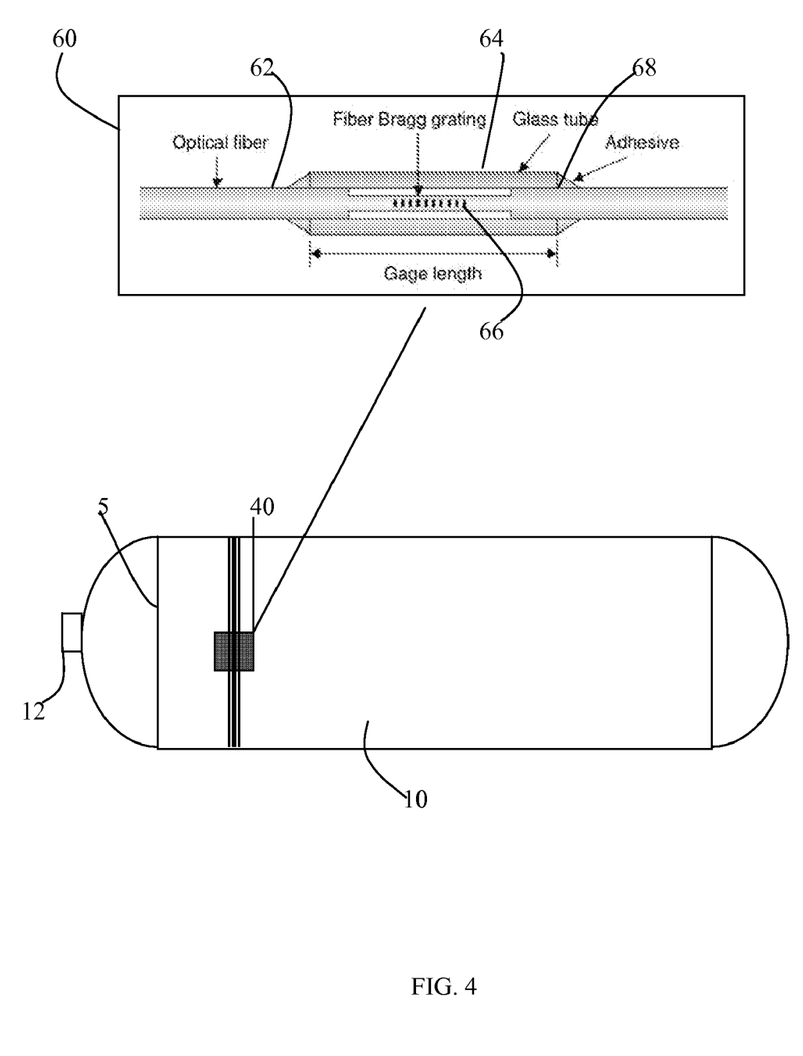
FIG. 4 illustrates another implementation of the hydrogen storage system, depicting a fiber optic embedded strain gauge present in the container.

In another implementation, the sensor 40 may be a fiber optic strain gauge 60. As illustrated in FIG. 4, a fiber optic strain gauge 60 comprises a fiber optic cable 62 embedded in the wall of the container 10. The fiber optic cable 62 includes a Bragg grating 66 enclosed in a glass tube 62. The glass tube 62 is attached to the fiber optic 62 cable utilizing adhesives 68. A fiber optic Bragg grating 66 is a periodic variation in the index of refraction along a length of optical fiber. In a fiber optic strain gauge 60, the sensor 40 measures the strain by shifting the light frequency of the light reflected down the fiber from the Bragg grating 66, which is embedded inside the fiber 62 itself. Fiber optic cables are useful since fiber optics are immune to electrical interference and corrosion.

Figure 5:
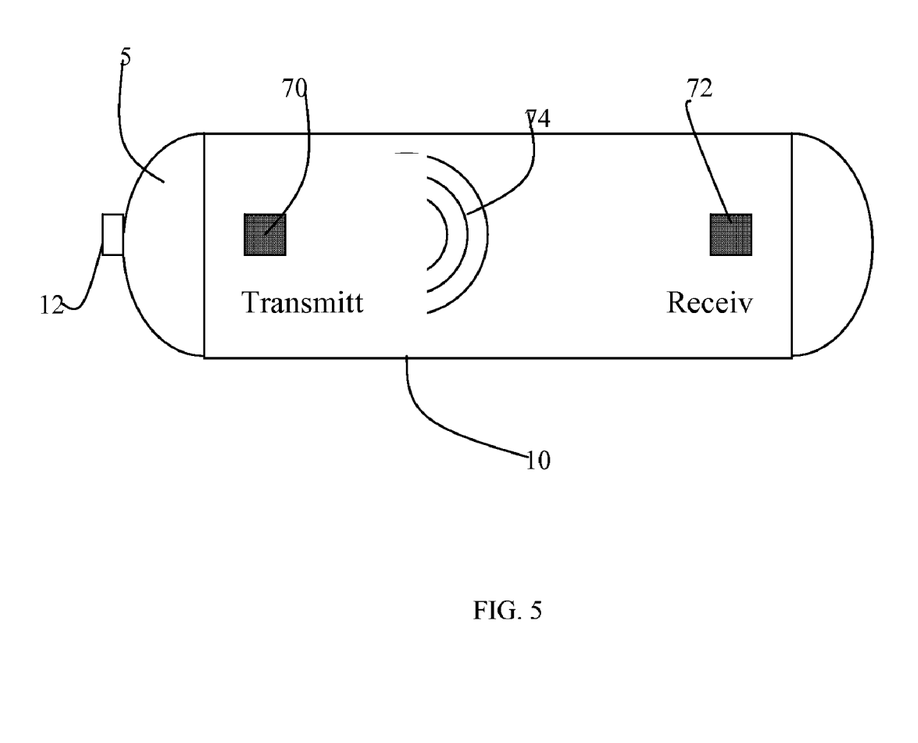
FIG. 5 illustrates another implementation of the hydrogen storage system, depicting a fiber optic embedded strain gauge present in the container.

Another implementation is depicted by FIG. 5, showing the sensor 40 as an acoustic emission strain gauge. The acoustic emission strain gauge comprises a transmitter 70 and receiver 72 mounted to the container 10. The acoustic emission signal wave 74 can be used as a medium to detect when a material change has occurred to the container 10; i.e. strain on the container 10. When the receiver 72 has received this acoustic emission signal wave 74, the system senses that a fill cycle has occurred.

Figure 6:
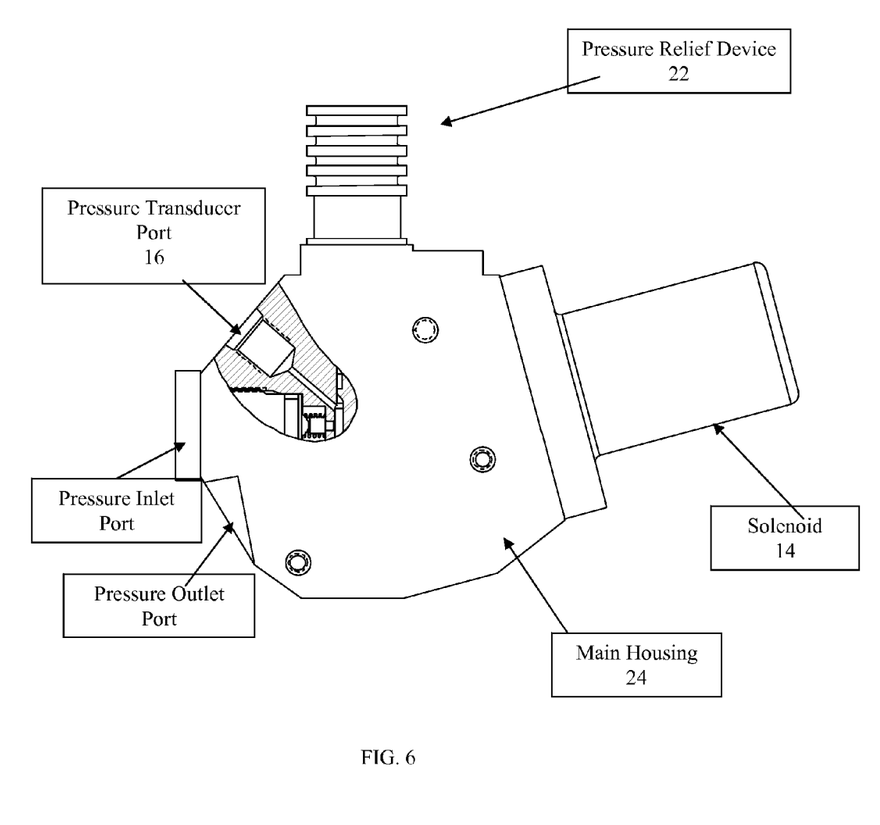
FIG. 6 illustrates a close up view of the valve in the hydrogen storage system, depicting a pressure transducer port present in the valve.

In another implementation of the disclosure, a flow switch or pressure drop switch is incorporated in the valve housing 24 or thereabouts to count the number of fill cycles. As shown in FIG. 6, there is a pressure transducer 16 in the valve 12. The pressure transducer 16 monitors the pressure in the valve 12. When the valve 12 is under pressure, the pressure transducer 16 is displaced and converts this displacement into an electrical output such as voltage or current. When the pressure transducer 16 emits an electrical voltage, the system counts one fill cycle.

To monitor the change in pressure, a moveable membrane is incorporated in the valve body housing 24. While the container is filled with hydrogen, the membrane contacts a switch that counts the number of fill cycles.

In another implementation, the temperature transducer 18 present in the system is used to monitor the number of fill cycles. The system 5 monitors when the temperature of the stored gas increases, as is associated with the filling process. In another implementation, the system 5 monitors and counts the number of times the temperature of the stored gas decreases, as is associated with the discharge process.

The safety system and shutdown device 5 could be controlled by a number of different controllers. In one embodiment, the safety and shutdown system is attached to the engine control unit in the vehicle. Signals from the sensor 40 will be processed by the fuel system controller to keep track of the total number of fills.

In another implementation, the sensor 40 or strain gauge may be connected to separate microprocessor attached to the container 10. The microprocessor will count the number of fill cycles. Once the number of fills has reached the predetermined termination point, the microprocessor activates a shut-off device 46, rendering the container unusable.

In other implementations, the controller 42 may be a mechanical counter. The mechanical counter may comprise a switch that is activated wherever a fill cycle is completed. The mechanical counter could then disable the system and prevent further use of the hydrogen container 10.

In an exemplary implementation, as the predetermined number of fill cycles has been reached, the controller 42 will activate the check valve 5 to prevent further filling of the storage system. Thus, the system will shut down the check valve and prevent any more fuel from entering the system.

In another implementation, the controller 42 will permanently shut off power to the solenoid valve 3 such that no fuel could be released. This will essentially disable the fuel system and ground the vehicle.

In another implementation of the disclosure, the controller 42 will cause the pressure transducer 16 to send a spurious "full" signal to the refueling station and/or vehicle on-board refueling control unit such that the container 10 cannot be filled any further due to the "full" indication.

In exemplary implementations, the shutdown system further comprises a warning device 44 to notify the driver of the vehicle that the container 10 is nearing it predetermined termination point. The warning device 44 will indicate to a driver of the vehicle that service is needed, possibly replacement of the container, to continue operation of the vehicle In another implementation of the disclosure, hardware and software measures 48 are introduced to render the fill cycle and the shut-off device 46 tamper-proof, in a fashion similar to odometer tamper protection of the present day vehicles. This prevents users of a vehicle from overriding the system, and continuing to use the hydrogen container 10 after the container 10 has realized its full life.

The various implementations of the present disclosure are applicable to pressurized and liquid hydrogen storage systems, either in the form of compressed gas at generally room temperature, compressed gas at temperatures between room temperature and cryogenic temperatures and gas that is stored by means of physisorption or in the form of chemical hydrides.

While the apparatus and method have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

What is claimed is:

1. A safety warning and shutdown system for a hydrogen storage container comprising:
    an on-board valve assembly fixedly attached to the container, the valve assembly having a check valve for filling the hydrogen storage container, an electrical solenoid, a pressure transducer configured to measure pressure within the hydrogen storage container, and a temperature transducer configured to measure temperature within the hydrogen storage container;
    a sensor to monitor a number of fill cycles; and
    a shut-off device to disable the valve assembly and prevent further use of the hydrogen system after reaching a pre-determined limit for the number of fill cycles.

2. The safety warning and shutdown system of claim 1 wherein the sensor is strain gauge placed in the fuel container.

3. The safety warning and shutdown system of claim 1 wherein the sensor comprises a strain gauge utilizing embedded optical fibers to measure the strain in the container.

4. The safety warning and shutdown system of claim 1 wherein the sensor is a metallic strain gauge in the container to measure strain.

5. The safety warning and shutdown system of claim 1 wherein the sensor is utilizes acoustic emissions to measure strain.

6. The safety warning and shutdown system of claim 1 wherein the sensor is a strain gauge comprising a membrane in the valve assembly activated upon a pressure change in the valve assembly.

7. The safety warning and shutdown system of claim 1 further comprising a warning system to notify a user of a vehicle that the system is nearing the pre-determined limit.

8. The safety warning and shutdown system of claim 1 further comprising software and hardware measures to prevent tampering with the system once the system as reached the pre-determined limit.

9. The safety warning and shutdown system of claim 1 wherein the fill cycle is counted each time the hydrogen container is filled above 90% of the rated pressure or mass.

10. The safety warning and shutdown system of claim 1 wherein the shut down device is a controller that counts the number of fill cycles.

11. The safety warning and shutdown system of claim 1 wherein the shut down device deactivates the electrical solenoid to disable the valve assembly and prevent further use of the hydrogen system after the number of fill cycles has reached the pre-determined limit.

12. The safety warning and shutdown system of claim 1 wherein the shut down device deactivates the check valve to disable the valve assembly and prevent further use of the hydrogen system after the number of fill cycles has reached the pre-determined limit.

13. The safety warning and shutdown system of claim 1 wherein the shut down device is a controller that counts the number of times the temperature of the stored gas increases, as is associated with the filling process.

14. The safety warning and shutdown system of claim 1 wherein the shut down device is a controller that counts the number of times the temperature of the stored gas decreases, as is associated with the discharge process.

15. The safety warning and shutdown system of claim 1 wherein the system prevents further filling of the hydrogen storage system after the number of fill cycles has reached the pre-determined limit, by sending a false signal indicating that the system is already fully filled to the refueling station controller.

16. The safety warning and shutdown system of claim 1 wherein the controller is the engine control unit.

17. The safety warning and shutdown system of claim 1 wherein the controller is a separate microprocessor attached to the tank.

18. A method of providing a safety warning and shutdown system for a hydrogen storage container comprising:

providing a hydrogen storage container, an on-board valve assembly fixedly attached to the container, the valve assembly having a check valve for filling the hydrogen storage container, an electrical solenoid, a pressure transducer configured to measure pressure within the hydrogen storage container, and a temperature transducer configured to measure temperature within the hydrogen storage container;

counting a number of fill cycles utilizing a sensor; and disabling the valve assembly and preventing further use of the hydrogen system after reaching a pre-determined number of fill cycles.

19. The method of claim 18 wherein the sensor comprises a strain gauge utilizing embedded optical fibers in the container to measure the strain.

20. The method of claim 18 wherein the sensor is a metallic strain gauge in the container to measure strain.

21. The method of claim 18 wherein an acoustic emissions monitoring system is utilized to measure strain.

22. The method of claim 18 wherein the sensor is a pressure transducer located in the valve assembly of the system.

23. The method of claim 18 further comprising warning a user of a vehicle that the system is nearing the pre-determined number of fill cycles.

24. The method of claim 18 further comprising to prevent tampering with software and hardware measures within the system once the system as reached the pre-determined number of fill cycles.

25. The method of claim 18 further comprising deactivating the check valve to disable the valve assembly and prevent further use of the hydrogen system after the number of fill cycles has reached the pre-determined number.

* * * * *